(12) United States Patent
Su et al.

(10) Patent No.: US 10,801,539 B2
(45) Date of Patent: Oct. 13, 2020

(54) SCREW CAPABLE OF REDUCING DRILLING TORQUE

(71) Applicant: TAIWAN SHAN YIN INTERNATIONAL CO., LTD., Kaohsiung (TW)

(72) Inventors: Kou-Tsair Su, Kaohsiung (TW); Chen-Long Su, Kaohsiung (TW)

(73) Assignee: Taiwan Shan Yin International Co., Ltd., Kaohsiung (TW)

( * ) Notice: Subject to any disclaimer, the term of this patent is extended or adjusted under 35 U.S.C. 154(b) by 246 days.

(21) Appl. No.: 16/136,642

(22) Filed: Sep. 20, 2018

(65) Prior Publication Data

US 2020/0096034 A1 Mar. 26, 2020

(51) Int. Cl.
*F16B 25/00* (2006.01)

(52) U.S. Cl.
CPC ...... *F16B 25/0052* (2013.01); *F16B 25/0047* (2013.01); *F16B 25/00* (2013.01)

(58) Field of Classification Search
CPC ........ F16B 13/00; F16B 13/002; F16B 25/00; F16B 25/0047; F16B 25/0052
USPC ................ 411/386, 387.1, 387.5, 387.8, 411
See application file for complete search history.

(56) References Cited

U.S. PATENT DOCUMENTS

| | | | | |
|---|---|---|---|---|
| 3,517,717 A | * | 6/1970 | Orlomoski | F16B 39/284 411/311 |
| 5,827,030 A | * | 10/1998 | Dicke | F16B 25/0015 411/387.4 |
| 5,897,280 A | * | 4/1999 | Dicke | F16B 25/0015 411/411 |
| 6,216,510 B1 | * | 4/2001 | Hashimoto | F16B 39/30 411/311 |
| 6,789,991 B2 | * | 9/2004 | Hsu | F16B 25/0031 411/311 |
| 7,163,366 B2 | * | 1/2007 | Chen | F16B 25/0047 411/411 |
| 7,798,756 B2 | * | 9/2010 | Chang | F16B 25/10 411/386 |
| 8,348,571 B2 | * | 1/2013 | Shih | F16B 25/0015 411/386 |
| 8,360,702 B2 | * | 1/2013 | Yu | F16B 25/0015 411/386 |
| 8,864,430 B2 | * | 10/2014 | Su | F16B 25/0015 411/386 |

(Continued)

*Primary Examiner* — Roberta S Delisle
(74) *Attorney, Agent, or Firm* — Rosenberg, Klein & Lee

(57) ABSTRACT

A screw capable of reducing drilling torque includes a shank provided with cutting threads, and a head and a drilling portion respectively formed at two ends of the shank. Each cutting thread has two opposite flank surfaces converging at a thread crest. On the thread crest are recessedly formed notches alternating with grooves. Each groove has an upper crest edge and a lower crest edge meeting the flank surfaces respectively. Each notch has a first cutting edge and a second cutting edge meeting the flank surfaces respectively. The above cutting edges and crest edges cooperate to provide multiple cutting points, thereby increasing the cutting efficiency, preventing the improper entanglement of fibers, and reducing drilling torque for easier screwing. The notches and grooves accommodate and press partial debris for achieving a stable and tight engagement between the screw and an object and increasing the ability of resisting the pulling-out force.

6 Claims, 8 Drawing Sheets

(56) References Cited

U.S. PATENT DOCUMENTS

| | | | |
|---|---|---|---|
| 2007/0286701 A1* | 12/2007 | Hsu | F16B 25/0052 411/387.1 |
| 2013/0039720 A1* | 2/2013 | Shih | F16B 25/0015 411/387.4 |
| 2016/0032956 A1* | 2/2016 | Wu | F16B 25/0068 411/387.8 |

* cited by examiner

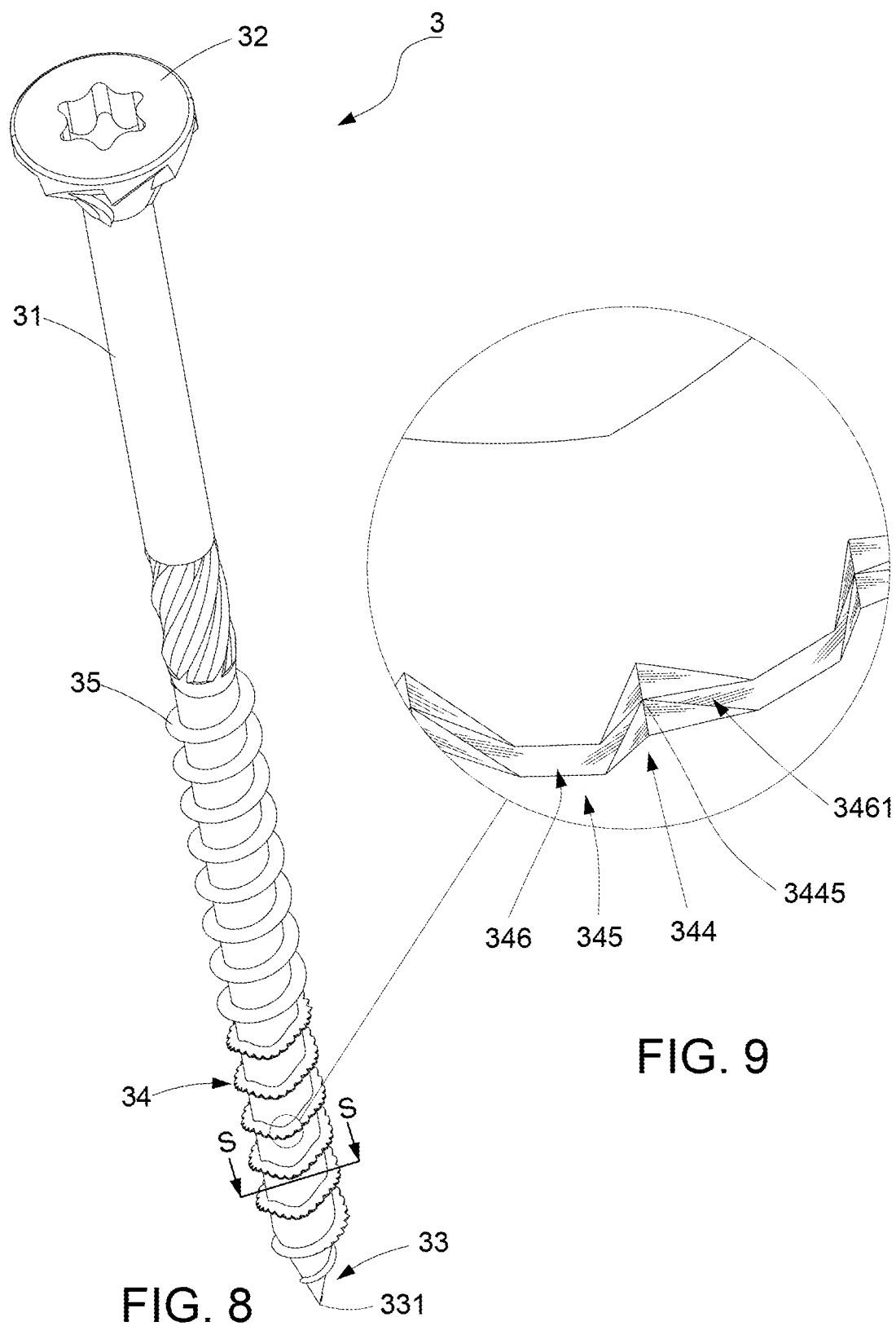

SCREW CAPABLE OF REDUCING DRILLING TORQUE

BACKGROUND OF THE INVENTION

1. Field of the Invention

This invention relates to a screw and relates particularly to a screw capable of reducing drilling torque.

2. Description of the Related Art

Referring to FIG. 1, a conventional screw 1 comprises a shank 11, a head 12 fitted to one end the shank 11, a drilling portion 13 fitted to another end of the shank 11 and opposite to the head 12, and a plurality of threads 14 spirally formed on the shank 11 and extending toward the drilling portion 13. The drilling portion 13 further tapers off to a tip 131. During a screwing operation, the tip 131 is situated at a surface of an object (not shown). The head 12 then receives a rotational force in order that the tip 131 synchronously executes the drilling operation of the object via gradually pressing downwards. After the drilling portion 13 gradually screws into the object, the threads 14 continue to execute the cutting operation of the object, thereby threading the shank 11 into the object through the cutting action of the threads 14 and completing the screwing operation of the screw 1.

However, the disclosed screw 1 still has problems. During the beginning of the screwing operation, the screw 1 only relies on the tip 131 to enter into the object by pressing the object directly that may slow down the screwing operation. The threads 14 which follow the drilling portion 13 to execute the cutting operation of the screw 1 after the drilling portion 13 enters into the object are unable to serve fibers of the object effectively. Meanwhile, the unserved fibers entangle around the shank 11 and the drilling portion 13 easily to result in the increasing drilling torque. Further, debris caused by cutting the object during the screwing operation cannot be excluded smoothly because the fibers accumulate between the screw 1 and the object. Therefore, the screw 1 is hindered from screwing downwards to increase the screwing difficulty. Moreover, the screw 1 may be damaged, blunt, or snapped and the object may crack if the screw 1 keeps screwing downwards and pressing the accumulated debris. Furthermore, the screw 1 engages with the object ineffectively to result in the loose engagement. The screw 1 may loosen, sway, or fall off when the screw 1 is pulled or shaken by external force. Thus, the screwing effect of the screw 1 is poor. The screw 1 still needs to be improved.

SUMMARY OF THE INVENTION

The object of this invention is to provide a screw capable of serving fibers effectively to reduce the drilling torque and increase cutting efficiency and accommodating partial debris to attain a preferable engagement and increase the ability of resisting the pulling-out force.

The screw capable of reducing drilling torque of this invention comprises a shank, a head fitted at one end of the shank, a drilling portion fitted at another end of the shank and opposite to the head, and a plurality of cutting threads spiraling on the shank. Each cutting thread has an upper flank surface and a lower flank surface respectively extending outwards from the shank to converge at a thread crest, a plurality of notches formed at the thread crest to define a plurality of crest portions, alternating with the notches, and a plurality of grooves recessed on the crest portions to allow each groove to form an upper crest edge and a lower crest edge which contact with the upper flank surface and the lower flank surface respectively. Each notch has a first cutting wall with a first cutting edge, a second cutting wall with a second cutting edge connected to the first cutting edge, and a root formed at a convergence of the first and second cutting walls. Thus, the first and second cutting edges cooperate with the upper and lower crest edges to provide multiple cutting points, thereby increasing the cutting efficiency, breaking fibers of an object effectively to prevent the screw from being entangled in the fibers, and reducing the drilling torque greatly. Further, the notches and grooves help accommodate partial debris, thereby attaining a stable and tight engagement between the screw and the object and increasing the ability of resisting the pulling-out force.

Preferably, the upper and lower flank surfaces of the cutting threads lie like waves rising and falling to allow the cutting threads to form in a wavy arrangement.

Preferably, each groove has two ends extending into the roots of two adjacent notches to thereby define an extensive space which allows two adjacent grooves to connect together.

Preferably, the first cutting edge of each notch and a second cutting edge of an adjacent notch meet at a point from which a reference line is defined. The first and second cutting edges of each notch respectively sloping with respect to the reference line at a first cutting angle and a second cutting angle. The first cutting angle is different from the second cutting angle.

Preferably, the groove defines a baseline passing through a center thereof and normal to an axis of the shank. The upper and lower flank surfaces respectively sloping with respect to the baseline at an upper flank angle and a lower flank angle. The upper flank angle is different from the lower flank angle.

Preferably, the screw further includes a plurality of auxiliary threads spirally disposed on the shank. The auxiliary threads are formed without the notches and grooves.

BRIEF DESCRIPTION OF THE DRAWINGS

FIG. 8 is a perspective view showing a second preferred embodiment of this invention characterized by a plurality of extensive spaces;
FIG. 9 is an enlarged view showing a partial element of FIG. 8.

DETAILED DESCRIPTION OF THE PREFERRED EMBODIMENTS

Figure 1:
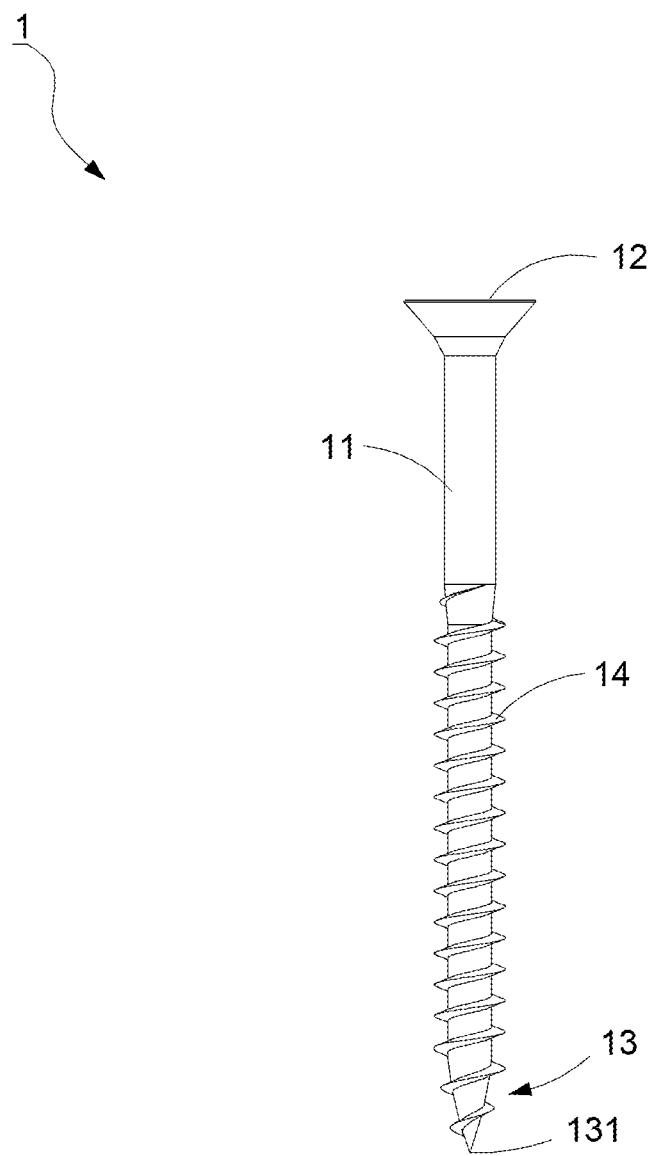
FIG. 1 is a schematic view showing a conventional screw.
Figures 2, 3:
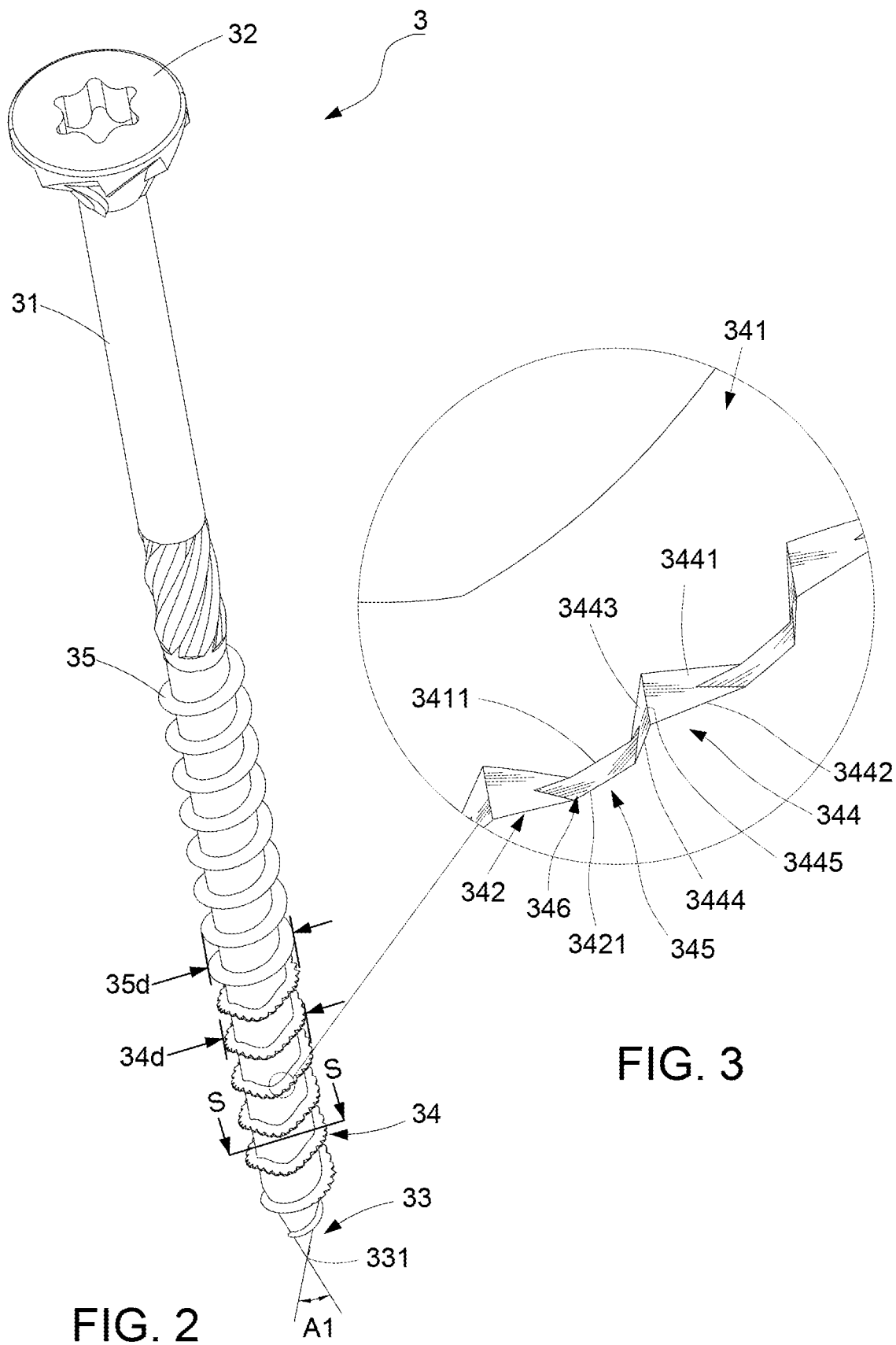
FIG. 2 is a perspective view showing a first preferred embodiment of this invention.
FIG. 3 is an enlarged view showing a partial element of FIG. 2.

Referring to FIG. 2, a first preferred embodiment of a screw 3 capable of reducing drilling torque of this invention is disclosed. The screw 3 includes a shank 31, a head 32 connected to one side of the shank 31, a drilling portion 33 formed at another side of the shank 31 and opposite to the head 32, and a plurality of cutting threads 34 spirally disposed on the shank 31. The drilling portion 33 tapers off to a tip 331 and further extends outwards to define a drilling angle A1 which preferably ranges from 22° to 26°. In this preferred embodiment, a plurality of auxiliary threads 35 are spirally formed on the shank 31 between the head 32 and the cutting threads 34 without any notch or groove formed on the auxiliary threads 35. The cutting threads 34 are preferable to be arranged between the auxiliary threads 35 and the drilling portion 33. In addition, a diameter 34d of the cutting threads 34 is smaller than a diameter 35d of the auxiliary threads 35.

Figure 4:
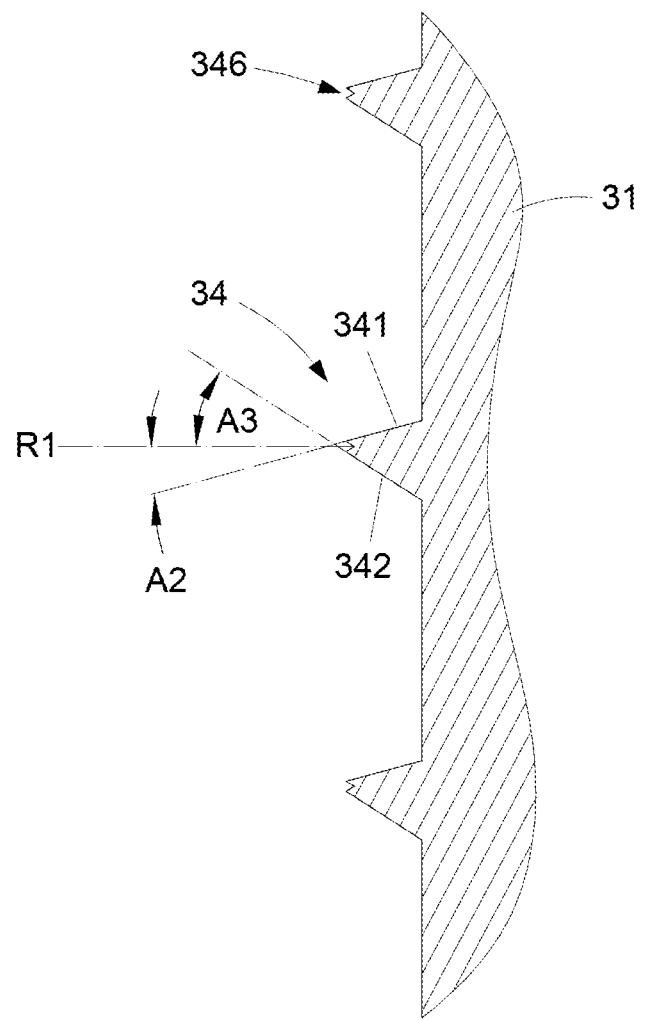
FIG. 4 is a cross-sectional view showing the cutting threads.
Figure 6:
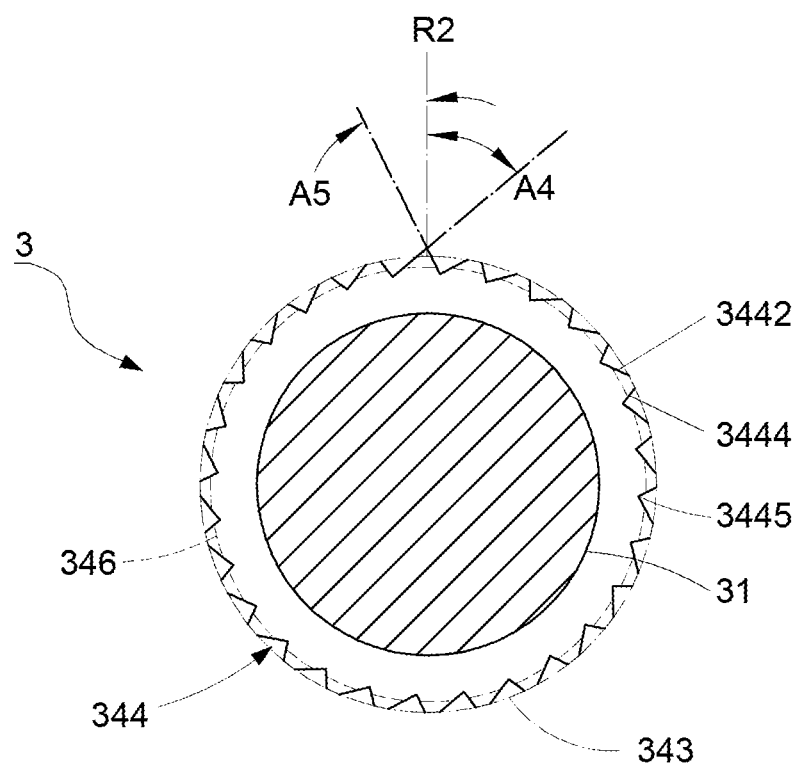
FIG. 6 is a cross-sectional view showing the cutting threads as seen along the line S-S of FIG. 2.

Referring to FIG. 2 and FIG. 3, each cutting thread 34 has an upper flank surface 341 extending downwards from the shank 31, a lower flank surface 342 extending upwards from the shank 31, a thread crest 343 formed at a convergence of the upper flank surface 341 and the lower flank surface 342 as shown in FIG. 6, a plurality of notches 344 carving in the thread crest 343 to divide the cutting threads 34 into a plurality of crest portions 345, and a plurality of grooves 346 recessing in the crest portions 345 to allow each groove 346 to form an upper crest edge 3411 meeting the upper flank surface 341 and a lower crest edge 3421 meeting the lower flank surface 342. The thread crest 343 which is shown in phantom lines in FIG. 6 is the original crest of the cutting threads 34 when the cutting threads 34 are provided without any notch 344 and groove 346. In this preferred embodiment, the upper and lower flank surfaces 341 342 of the cutting threads 34 are arranged in a form of alternate rises and falls to allow the cutting threads 34 to be in a wavy arrangement. Meanwhile, the notches 344 and the grooves 346 are cross-sectionally arranged in alternation as shown in FIG. 6. Referring to FIG. 4, the groove 346 defines a baseline R1 passing through a center of the groove 346 and perpendicular to an axis of the shank 31. The upper flank surface 341 slants with respect to the baseline R1 at an upper flank angle A2. The lower flank surface 342 slants with respect to the baseline R1 at a lower flank angle A3. The upper flank angle A2 is different from the lower flank angle A3. The upper flank angle A2 is inclined preferably at 10° and the lower angle A3 is inclined preferably at 30°.

Figure 5:
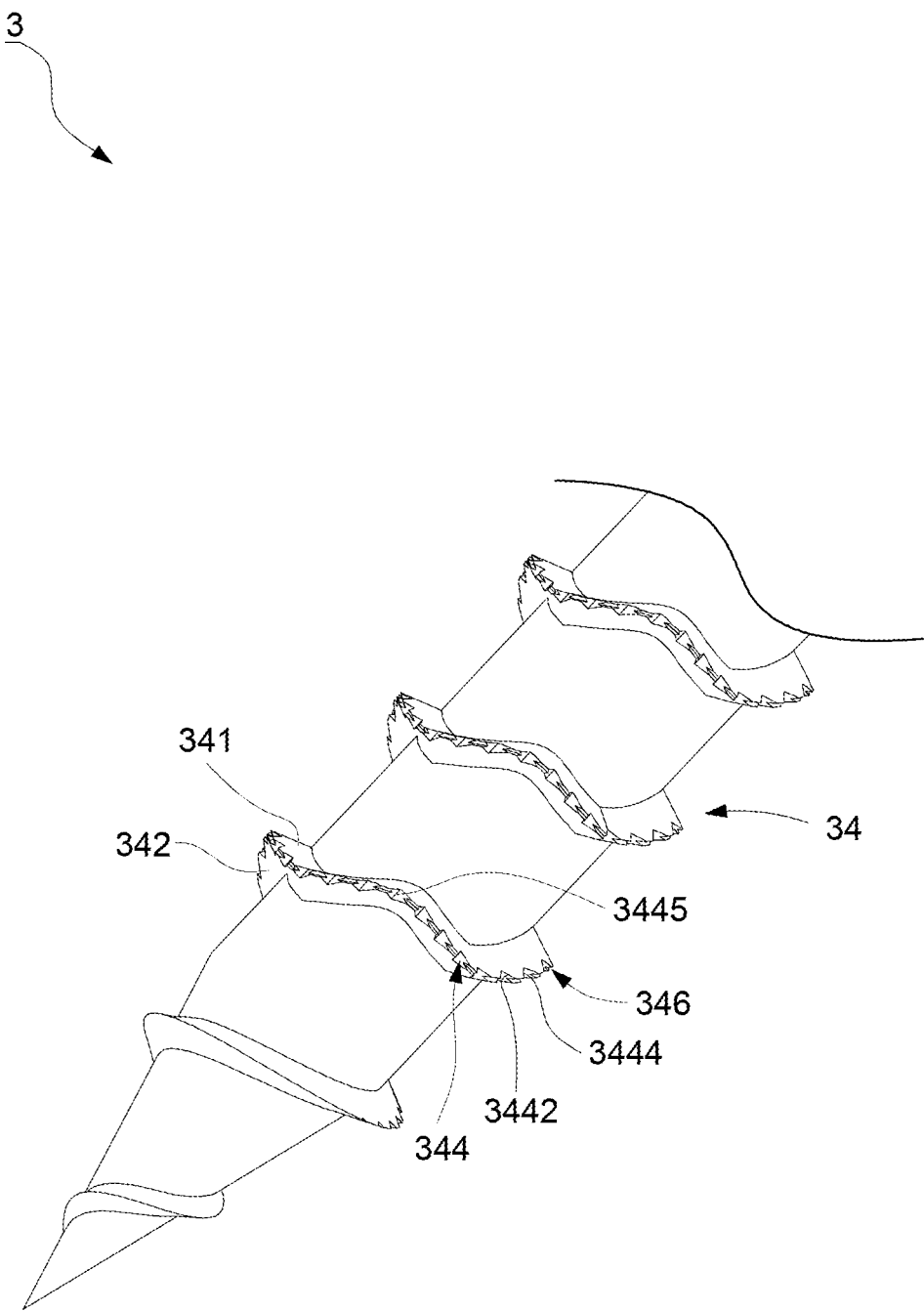
FIG. 5 is a perspective view showing the first preferred embodiment of this invention in another direction.

Referring to FIG. 3 and FIG. 5, each notch 344 has a first cutting wall 3441 with a first cutting edge 3442 meeting the upper and lower flank surfaces 341, 342, a second cutting wall 3443 with a second cutting edge 3444 connected to the first cutting edge 3442, and a root 3445 formed at a convergence of the first and second cutting walls 3441, 3443. Referring to FIG. 6, the first cutting edge 3442 of each notch 344 and a second cutting edge 3444 of an adjacent notch 344 meet at a point where a reference line R2 is defined. The first cutting edge 3442 and the second cutting edge 3444 of each notch 344 respectively slanting with respect to the reference line R2 at a first cutting angle A4 and a second cutting angle A5. The first cutting angle A4 is different from the second cutting angle A5. The first cutting angle A4 is inclined preferably at 60° and the second cutting A5 is inclined at 30°.

Figure 7:
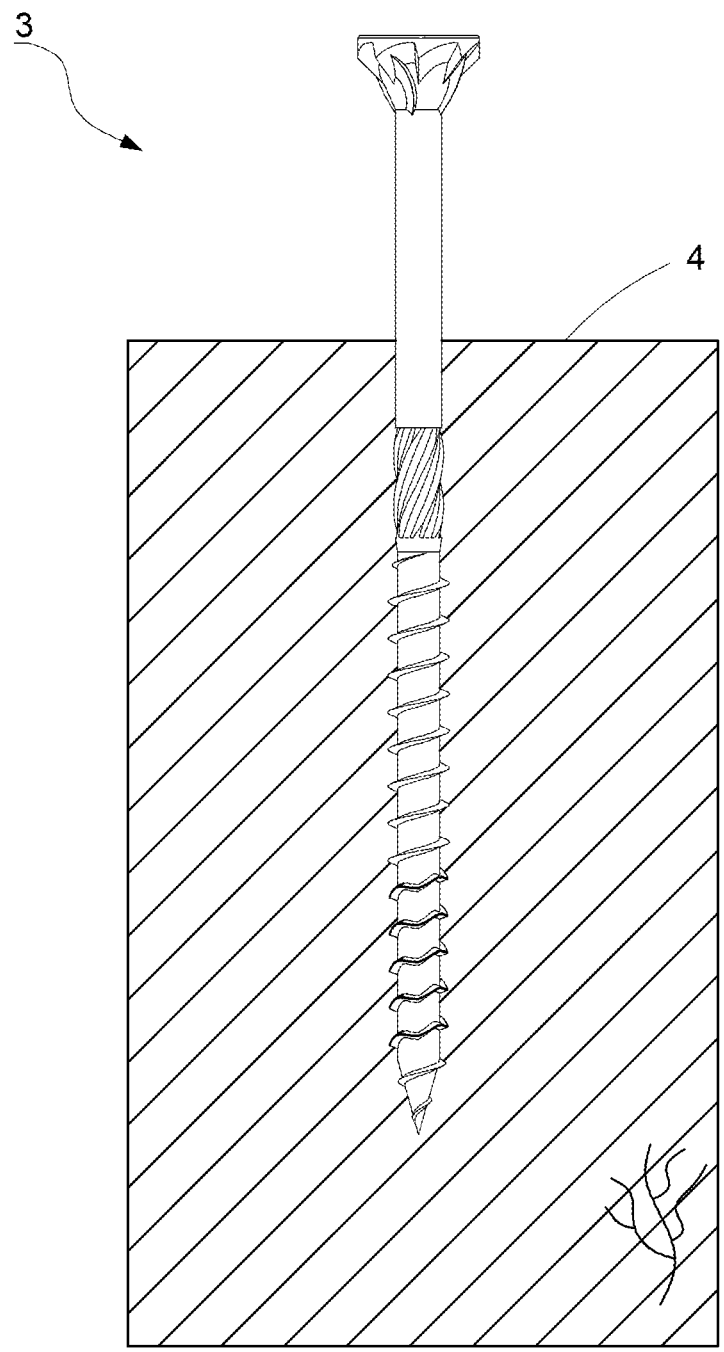
FIG. 7 is a schematic view showing a screwing operation of the first preferred embodiment of this invention.

Referring to FIG. 2, FIG. 3 and FIG. 7, a screwing operation of the screw 3 begins with positioning the tip 331 against a surface of an object 4. Then, the head 32 receives a rotation force from a driving tool (not shown) in order to carry out the drilling action of the tip 331. The cutting threads 34 then continue to execute the quick cutting operation of the object 4. Because the first cutting edges 3442, the second cutting edges 3444, the upper crest edges 3411, and the lower crest edges 3421 form multiple cutting points, thereby increasing the cutting efficiency and accelerating the cutting operation. Meanwhile, fibers of the object are served effectively to prevent the shank 31 and the drilling portion 33 from being entangled in the fibers and reduce the drilling torque greatly. in addition, debris caused by cutting the object 4 can be excluded outwards through the cutting threads 34 without being hindered by the unserved fibers, thereby achieving the effect of excluding the debris smoothly and rapidly, attaining the smooth screwing operation, and preventing the object 4 from cracking caused by continuously pressing the accumulated debris. Moreover, the notches 344 and the grooves 346 can properly accommodate and press partial debris, thereby attaining a stable and tight engagement between the screw 3 and the object 4 and increasing the ability of resisting the pulling-out force. Further, the auxiliary threads 35 with the diameter 35d larger than the diameter 34d of the cutting threads 34 follow the cutting threads 34 to execute the cutting operation to further achieve the tight engagement.

Figure 10:
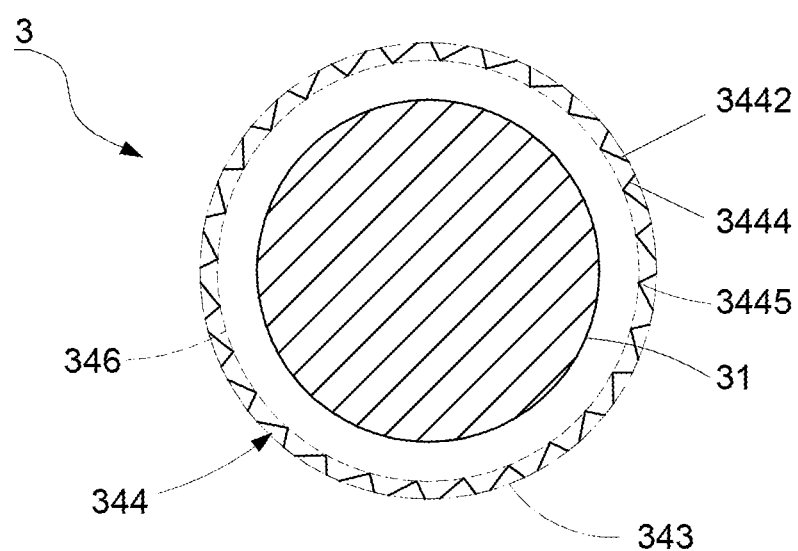
FIG. 10 is a cross-sectional view showing the cutting threads as seen along the line S-S of FIG. 8.

Referring to FIG. 8 to FIG. 10 show a second preferred embodiment of the screw 3 of this invention. The correlated elements and the concatenation of elements, the operation and objectives of the second preferred embodiment are the same as those of the first preferred embodiment . This embodiment is characterized in that each groove 346 recessedly formed on each crest portion 345 has two ends extending into two adjacent notches 344 respectively and reaching the roots 3445 of the two adjacent notches 344 to thereby define an extensive space 3461. The two adjacent grooves 346 are connected to each other by the extensive space 3461. The enlarged extensive space 3461 allows the groove 346 to guide the debris and exclude the debris quickly. Further, the extensive space 3461 can accommodate more debris, thereby achieving the tighter engagement between the screw 3 and the object 4 and increasing the ability of resisting the pulling-out force.

To sum up, the screw capable of reducing drilling torque of this invention takes advantages of the first and second cutting edges and the upper and lower crest edges to provide multiple cutting points, thereby increasing the cutting efficiency, breaking the fibers effectively to prevent the improper entanglement of the fibers around the screw, and reducing the drilling torque for easier screwing. Further, the notches and grooves accommodate and press partial debris for obtaining the stable and tight engagement between the screw and the object and increasing the ability of resisting the pulling-out force.

While the embodiments of this invention are shown and described, it is understood that further variations and modifications may be made without departing from the scope of this invention.

What is claimed is:

1. A screw capable of reducing drilling torque comprising a shank, a head disposed at one end of said shank, a drilling portion disposed at another end of said shank and opposite to said head, and a plurality of cutting threads spirally disposed on said shank, wherein each of said plurality of cutting threads includes an upper flank surface, a lower flank surface opposite to said upper flank surface, and a thread crest formed at a convergence of said upper and lower flank surfaces;

wherein a plurality of notches cut in said thread crest, to thereby define a plurality of spaced apart crest portions between two adjacent notches, a plurality of grooves being recessedly formed on said plurality of crest portions to thereby allow each of said grooves to form an upper crest edge and a lower crest edge which meet said upper flank surface and said lower flank surface respectively, said plurality of notches and said plurality of grooves being cross-sectionally arranged in alternation, each of said plurality of notches having a first cutting wall with a first cutting edge meeting both of said upper and lower flank surfaces and a second cutting wall with a second cutting edge connected to said first cutting edge, said first cutting wall and said second cutting wall converging at a root.

2. The screw as claimed in claim 1, wherein said upper and lower flank surfaces of said cutting threads lie in a form of alternate rises and falls to allow said cutting threads to be in a wavy arrangement.

3. The screw as claimed in claim 1, wherein each of said grooves recessedly formed on each of said crest portions has two ends extending into two adjacent notches respectively and reaching said roots of said two adjacent notches to thereby define an extensive space, two adjacent grooves being connected to each other by said extensive space.

4. The screw as claimed in claim 1, wherein said first cutting edge of each of said notches and a second cutting edge of an adjacent notch meet at a point from which a reference line is defined, said first cutting edge and said second cutting edge of each of said notches respectively sloping with respect to said reference line at a first cutting angle and a second cutting angle, said first cutting angle and said second cutting angle being different.

5. The screw as claimed in claim 1, wherein said groove defines a baseline passing through a center of said groove and normal to an axis of said shank, said upper flank surface sloping with respect to said baseline at an upper flank angle, said lower flank surface sloping with respect to said baseline at a lower flank angle, said upper flank angle and said lower flank angle being different.

6. The screw as claimed in claim 1, further including a plurality of auxiliary threads spirally disposed on said shank, said plurality of auxiliary threads being formed without said notches and said grooves.

* * * * *